United States Patent
Plickys

(10) Patent No.: US 10,077,103 B2
(45) Date of Patent: Sep. 18, 2018

(54) PROPELLER PITCH CHANGE ACTUATION SYSTEM

(71) Applicant: Hamilton Sundstrand Corporation, Charlotte, NC (US)

(72) Inventor: Mark R Plickys, Unionville, CT (US)

(73) Assignee: HAMILTON SUNDSTRAND CORPORATION, Charolotte, NC (US)

( * ) Notice: Subject to any disclaimer, the term of this patent is extended or adjusted under 35 U.S.C. 154(b) by 390 days.

(21) Appl. No.: 15/074,632

(22) Filed: Mar. 18, 2016

(65) Prior Publication Data

US 2017/0267328 A1    Sep. 21, 2017

(51) Int. Cl.
| | |
|---|---|
| B64C 11/38 | (2006.01) |
| B64C 11/32 | (2006.01) |
| B63H 3/00 | (2006.01) |
| B64F 5/10 | (2017.01) |

(52) U.S. Cl.
CPC ............... *B64C 11/32* (2013.01); *B63H 3/00* (2013.01); *B64C 11/38* (2013.01); *B64F 5/10* (2017.01)

(58) Field of Classification Search
CPC ......... B64C 11/30; B64C 11/32; B64C 11/38; B64C 11/42; B64F 5/10; F16C 9/04; F16C 29/082; F16C 31/02; F16C 33/046; F16C 33/08; F03D 7/0224
USPC ............................. 384/24, 434; 416/148, 150
See application file for complete search history.

(56) References Cited

U.S. PATENT DOCUMENTS

| | | | | |
|---|---|---|---|---|
| 414,746 | A * | 11/1889 | Anderson ............... | B61F 15/26 384/190.7 |
| 3,300,258 | A * | 1/1967 | Kompanek, Jr. ....... | F16C 33/14 384/280 |
| 5,174,718 | A | 12/1992 | Lampeter | |
| 6,511,292 | B2 * | 1/2003 | Perkinson ............... | B64C 11/40 416/157 R |
| 6,514,044 | B2 * | 2/2003 | Talasco ................... | B64C 11/30 416/155 |
| 7,296,969 | B2 * | 11/2007 | Raes ....................... | B64C 11/06 416/36 |
| 7,857,517 | B1 * | 12/2010 | Vicars ..................... | F16C 7/02 384/294 |
| 7,976,279 | B2 * | 7/2011 | Raes ....................... | B64C 11/38 416/155 |
| 8,133,027 | B2 * | 3/2012 | Carvalho ................ | B64C 11/30 416/1 |

(Continued)

FOREIGN PATENT DOCUMENTS

EP    2003055    12/2008

OTHER PUBLICATIONS

Extended European Search Report dated Aug. 17, 2017 in EP Application No. 17159888.1.

*Primary Examiner* — Matthew W Jellett
(74) *Attorney, Agent, or Firm* — Snell & Wilmer L.L.P.

(57) ABSTRACT

A yoke plate arrangement may comprise a yoke plate, a wear plate comprising a wear surface and a contact surface, wherein a post extends from the contact surface, and a yoke plate ear extending from the yoke plate in a radial direction, wherein a first aperture is disposed in the yoke plate ear, the post located at least partially within the first aperture, the contact surface being in contact with the yoke plate ear. The yoke plate arrangement may further comprise a retaining feature for coupling the wear plate to the yoke plate. The wear surface may be for engaging a trunnion bearing.

20 Claims, 4 Drawing Sheets

(56) References Cited

U.S. PATENT DOCUMENTS

| | | | |
|---|---|---|---|
| 8,147,142 B1* | 4/2012 | Peterson | F16C 17/02 175/403 |
| 8,439,640 B2* | 5/2013 | Arel | B64C 11/38 416/117 |
| 8,529,205 B2* | 9/2013 | Perkinson | B64C 11/38 416/1 |
| 8,932,177 B2* | 1/2015 | Suzuki | F16C 17/04 475/331 |
| 9,234,547 B2* | 1/2016 | Sandin | B65G 49/063 |
| 2010/0008779 A1 | 1/2010 | Carvalho | |
| 2014/0147061 A1* | 5/2014 | Linnenkohl | F16C 31/02 384/26 |
| 2014/0169961 A1 | 6/2014 | Plickys | |

* cited by examiner

PROPELLER PITCH CHANGE ACTUATION SYSTEM

FIELD

The present disclosure relates to propeller pitch change systems, and, more specifically, to a yoke plate arrangement for a propeller pitch change system.

BACKGROUND

Propeller pitch change actuation systems for aircraft include propeller blades attached to trunnion bearings. The trunnion bearings are coupled between an aft yoke plate and a forward yoke plate. The yoke plates may be translated forward and aft to rotate the propeller blades and ultimately change their pitch angles. Due to blade loading, friction causing motion, vibrations, etc., the yoke plates may wear over time. A yoke plate having extensive wear may be replaced by removing the entire propeller pitch change actuation system from the aircraft to replace the yoke plate.

SUMMARY

Systems for propeller pitch change actuation are disclosed herein. A yoke plate arrangement may comprise a yoke plate, a wear plate comprising a wear surface and a contact surface, wherein a post extends from the contact surface, and a yoke plate ear extending from the yoke plate, wherein a first aperture is disposed in the yoke plate ear, the post located at least partially within the first aperture, the contact surface configured to be in contact with the yoke plate ear.

In various embodiments, the first aperture may extend in a first direction and the yoke plate ear may comprise a second aperture extending in a second direction, the second direction being substantially perpendicular to the first direction, wherein the first aperture and the second aperture align. The yoke plate arrangement may further comprise a retaining feature, the retaining feature located at least partially within the second aperture and configured to retain the post inside of the first aperture. The post may include a trench extending in the second direction, the retaining feature located at least partially in the trench. The post may include a retaining aperture, the retaining feature located at least partially in the retaining aperture. The retaining feature may comprise a pin. The retaining feature may further comprise a set-screw, the set-screw threadingly attached to the second aperture. The first direction may comprise an axial direction and the second direction may comprise a circumferential direction. The wear surface may be configured to contact a trunnion. An anti-rotation surface may be disposed on the yoke plate ear. The anti-rotation surface may be configured to engage the wear plate to prevent the wear plate from rotating with respect to the yoke plate ear. The anti-rotation surface may be configured to engage a radially inward surface of the wear plate.

A propeller pitch change actuation system may comprise a propeller coupled to a trunnion, a forward yoke plate coupled to a shaft, the forward yoke plate comprising a forward yoke plate ear extending from the forward yoke plate, an aft yoke plate coupled to the shaft, the aft yoke plate comprising an aft yoke plate ear extending from the aft yoke plate, wherein a first aft aperture is disposed in the aft yoke plate ear, the first aperture extending in a first direction, the trunnion located between the forward yoke plate ear and the aft yoke plate ear, and an aft wear plate coupled to the aft yoke plate ear comprising a wear surface and a contact surface, wherein a post extends from the contact surface, the post located at least partially inside of the first aperture.

In various embodiments, the propeller pitch change actuation system may further comprise a forward wear plate coupled to the forward yoke plate ear. The wear surface may be in contact with the trunnion, the trunnion located between the aft wear plate and the forward wear plate. The contact surface may be in contact with the forward yoke plate ear. The propeller pitch change actuation system may further comprise a retaining feature configured to retain the post within the first aperture. A second aperture may be disposed in the aft yoke plate ear, the second aperture extending in a second direction, the retaining feature located at least partially within the second aperture.

A method of installing a wear plate onto a yoke plate may comprise inserting a wear plate post into a first aperture disposed in the yoke plate, pushing the wear plate post into the first aperture until a contact surface of the wear plate makes contact with a yoke plate ear, inserting a pin into a second aperture disposed in the yoke plate, and attaching a set-screw to the yoke plate ear to retain the pin.

In various embodiments, the pin may be inserted into a trench located in the wear plate post in response to the inserting the pin into the second aperture. The pin may be inserted into a retaining aperture located in the wear plate post in response to the inserting the pin into the second aperture.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
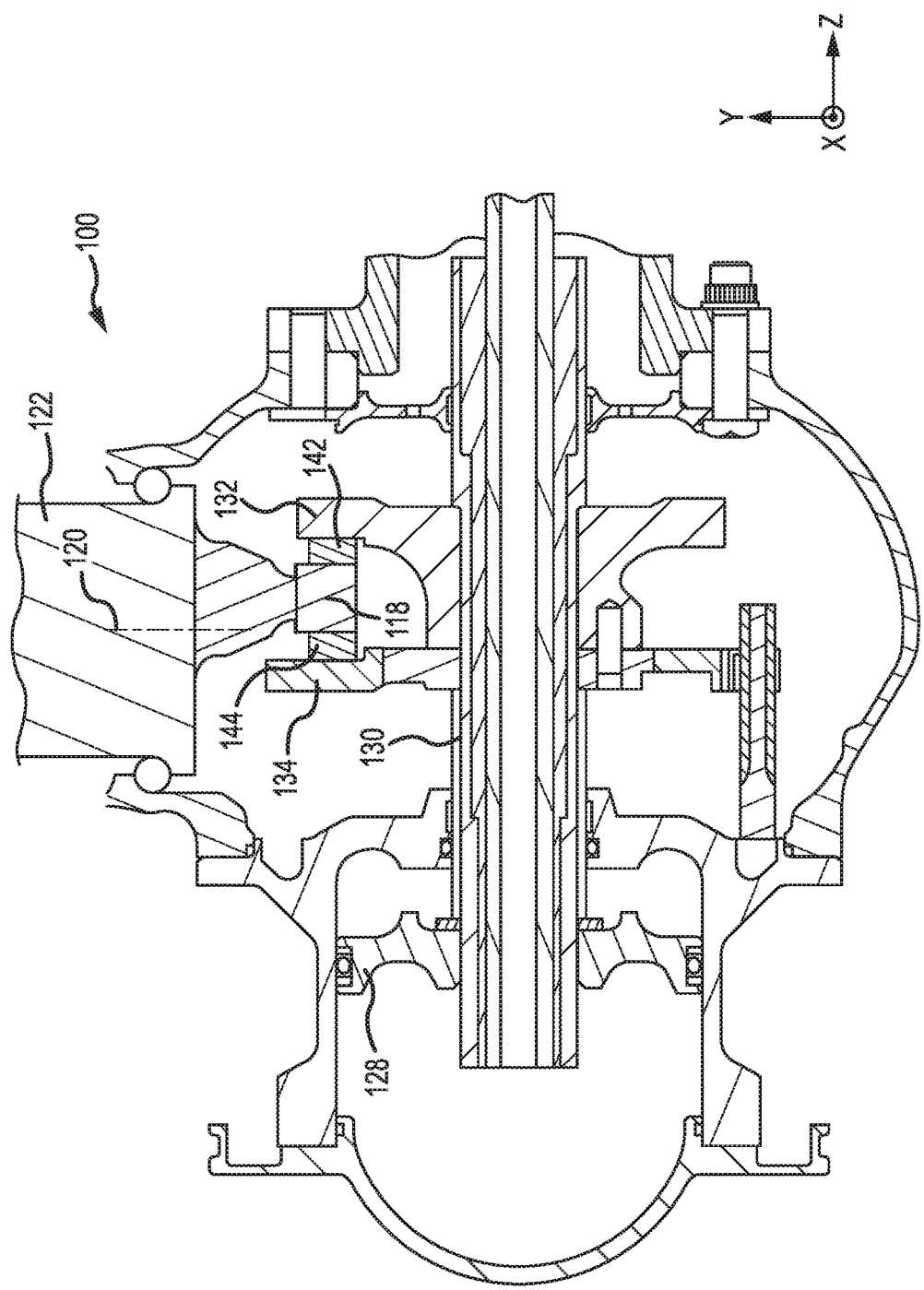
FIG. 1 illustrates a propeller pitch change actuation system, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Typically, a propeller pitch change actuation systems for aircraft include a propeller blade comprising a trunnion bearing, wherein the trunnion bearing is disposed between an aft yoke plate and a forward yoke plate. The yoke plates may be translated forward and aft to rotate the propeller, in a manner similar to a bell crank. Due to blade loads, which may be extremely high (i.e., in the thousands of pounds of force range), the yoke plates may wear over time. Thus, at various maintenance intervals, the entire propeller pitch change actuation system may be removed from the aircraft to replace the yoke plates.

A replaceable wear plate is provided herein. The wear plate is removably coupled to a yoke plate. The wear plate acts as a sacrificial part to extend the life of the yoke plate and to simplify maintenance due to worn parts, among other benefits.

With reference to FIG. 1, a propeller pitch change actuation system 100 is illustrated, in accordance with various embodiments. An xyz-axes is provided for ease of illustration. A propeller pitch change actuation system 100 may include a forward yoke plate 134 and an aft yoke plate 132. Forward yoke plate 134 may be coupled to aft yoke plate 132. Forward yoke plate 134 may be coupled to shaft 130. Aft yoke plate 132 may be coupled to shaft 130. Forward yoke plate 134 and aft yoke plate 132 may be coupled to piston 128. Hydraulic pressure may be applied to piston 128 to move forward yoke plate 134 and aft yoke plate 132 forward and aft (i.e., along the z-axis). Propeller pitch change actuation system 100 may include propeller blades 122. Propeller blades 122 may be coupled to trunnion 118. In various embodiments, trunnion 118 may comprise a trunnion bearing. Forward yoke plate 134 and aft yoke plate 132 may be coupled to trunnion 118. In various embodiments, trunnion 118 may be trapped between forward yoke plate 134 and aft yoke plate 132. Propeller blades 122 may rotate about rotation axis 120 in response to forward yoke plate 134 and aft yoke plate 132 moving forward and/or aft (i.e., along the z-axis).

Figure 3C:
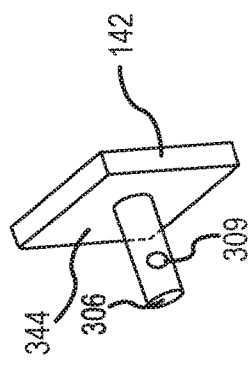
FIG. 3C illustrates a wear plate for a yoke plate, in accordance with various embodiments.
Figure 3B:
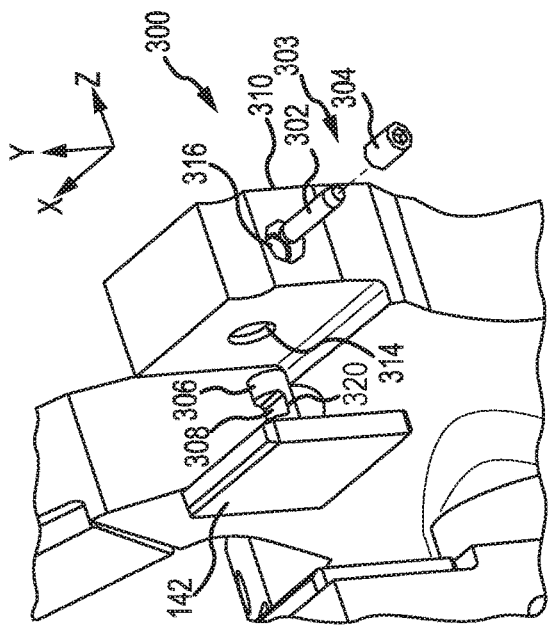
FIG. 3B illustrates an exploded view of a yoke plate arrangement, in accordance with various embodiments.
Figure 3A:
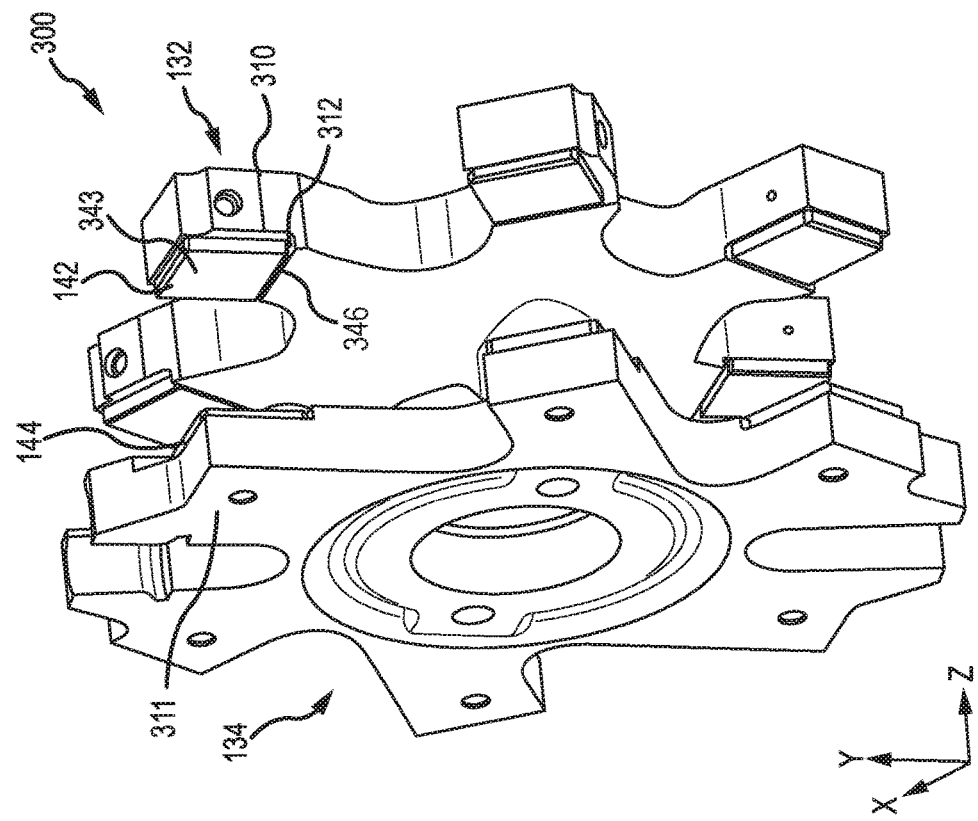
FIG. 3A illustrates a perspective view of yoke plate arrangement, in accordance with various embodiments.

With momentary reference to FIG. 3A, a wear plate (also referred to herein as an aft wear plate) 142 may be coupled to aft yoke plate 132. A wear plate (also referred to herein as a forward wear plate) 144 may be coupled to forward yoke plate 134.

Figure 2A:
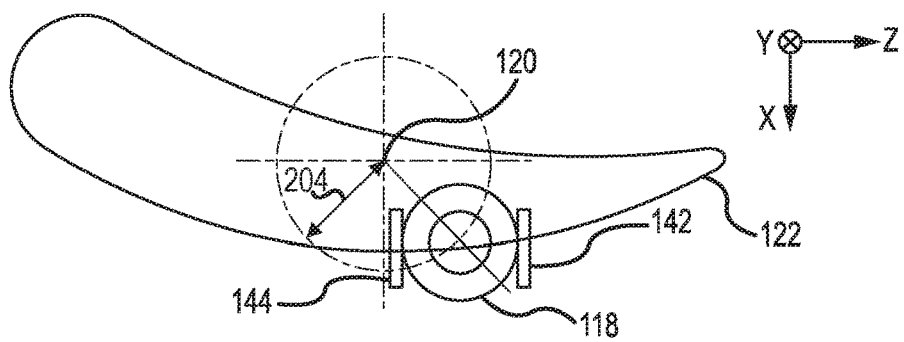
FIG. 2A illustrates a radial view of a propeller in a feather blade angle position, in accordance with various embodiments.
Figure 2B:
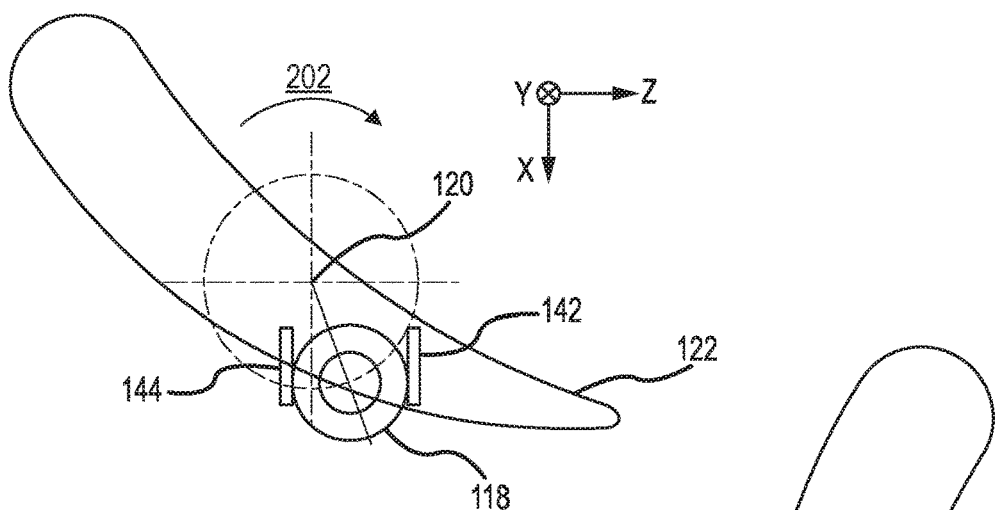
FIG. 2B illustrates a radial view of a propeller in a cruise blade angle position, in accordance with various embodiments.
Figure 2C:
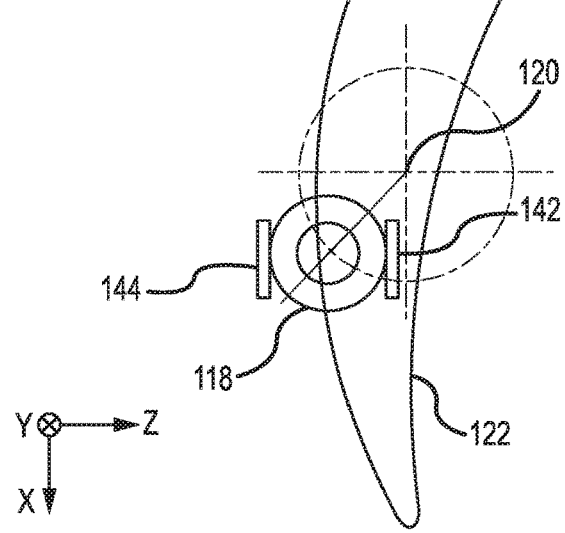
FIG. 2C illustrates a radial view of a propeller in a reverse blade angle position, in accordance with various embodiments.

With reference to FIG. 2A, a radial view of propeller blades 122 in a feather blade angle position is illustrated, in accordance with various embodiments. As wear plate 142 and wear plate 144 travel from a forward position to an aft position (in the negative z-direction), as illustrated by FIGS. 2A-2C, trunnion 118 may travel in an arc-like motion about rotation axis 120. More particularly, trunnion 118 may travel in an arc about rotation axis 120 having a radius 204.

With reference to FIG. 2B, a radial view of propeller blades 122 in a cruise blade angle position is illustrated, in accordance with various embodiments. Propeller blades 122 may rotate in a rotational direction 202, (a first rotational direction, or the clockwise direction as illustrated in FIG. 2B) in response to wear plate 142 and wear plate 144 moving aft in the negative z-direction. Trunnion 118 may move relative to wear plate 142 and wear plate 144 in response to this motion. For example, trunnion 118 is illustrated as having moved outboard (in the x-direction) in FIG. 2B with respect to wear plate 142 and wear plate 144. Such relative motion may cause at least a portion of wear plate 142 and wear plate 144 to wear away or grind down over time.

With reference to FIG. 2C, a radial view of propeller blades 122 in a reverse blade angle position is illustrated, in accordance with various embodiments. The position of trunnion 118 relative to propeller 122 may be fixed. Thus, trunnion 118 may move in the arc-like motion defined by radius 204 (see FIG. 2A) about rotation axis 120, in response to wear plate 142 and wear plate 144 moving linearly motion (i.e., along the z-axis).

With reference to FIG. 3A, a perspective view of yoke plate arrangement 300 is illustrated, in accordance with various embodiments. Yoke plate arrangement 300 may include aft yoke plate 132 and wear plate 142. Aft yoke plate 132 may comprise a yoke plate ear (also referred to herein as an aft yoke plate ear) 310. Yoke plate ear 310 may extend from aft yoke plate 132. Yoke plate ear 310 may extend from aft yoke plate 132 in a radial direction or an outboard direction (i.e., in the positive y-direction). Wear plate 142 may comprise a wear surface 343. Wear surface 343 may be configured to contact trunnion 118 (see FIG. 1). Wear plate 142 is illustrated in an installed position. In various embodiments, wear plate 142 may comprise various surface coatings to prevent corrosion and/or increase hardness.

In various embodiments, wear plate 142 and/or aft yoke plate 132 may comprise steel. In various embodiments, wear plate 142 and/or aft yoke plate 132 may be hardened during a carburizing process to provide enhanced wear resistance. In various embodiments, yoke plate arrangement 300 may include forward yoke plate 134. Similar to aft yoke plate 132, forward yoke plate 134 may comprise a yoke plate ear (also referred to herein as a forward yoke plate ear) 311. Thus, wear plate 144 may be coupled to yoke plate ear 311. Wear plate 144 may be coupled to yoke plate ear 311 in a similar manner as wear plate 142 is coupled to yoke plate ear 310.

With reference to FIG. 3B, an exploded-view of yoke plate arrangement 300 is illustrated, in accordance with various embodiments. Wear plate 142 may comprise a post (also referred to herein as a wear plate post) 306. With momentary reference to FIG. 3B and FIG. 3C, post 306 may extend from contact surface 344. Contact surface 344 may make contact with yoke plate ear 310 when in an installed position.

Yoke plate ear 310 may include a first aperture 314. First aperture 314 may extend in the axial direction (z-direction or first direction). Yoke plate ear 310 may include a second aperture 316. Second aperture 316 may extend in the circumferential direction (x-direction or second direction). In various embodiments, first aperture 314 may be substantially perpendicular to second aperture 316. In various embodiments, first aperture 314 and second aperture 316 may intersect or align.

Yoke plate arrangement 300 may include a retaining feature 303. In various embodiments, retaining feature 303 may comprise a pin 302. In various embodiments, retaining feature 303 may comprise a set-screw 304. In various embodiments, retaining feature 303 may be configured to prevent post 306 from moving out of first aperture 314.

Post 306 may comprise a cylindrical geometry as illustrated in FIG. 3B. However, post 306 may comprise any suitable geometry, such as triangular, square, elliptical, or trapezoidal, for example. A trench 308 may be disposed in post 306. In various embodiments, trench 308 may comprise a cut-out 320. Although illustrated in FIG. 3B as comprising a trench, in various embodiments and with momentary additional reference to FIG. 3C, post 306 may comprise a retaining aperture 309. In various embodiments, retaining aperture 309 may be drilled into post 306. In various embodiments, retaining aperture 309 may be cast into post 306. In various embodiments, retaining aperture 309 may comprise a bore. In various embodiments, retaining feature 303 may extend through second aperture 316 and be located at least partially within trench 308. In various embodiments, retaining feature 303 may extend through second aperture 316 and be located at least partially within retaining aperture 309. In this manner, retaining feature 303 may be configured to retain post 306 inside of first aperture 314. In various embodiments, trench 308 may extend in the circumferential direction (x-direction, also referred to as a second direction). In various embodiments, retaining aperture 309 may extend in the circumferential direction (x-direction or second direction).

With reference now to FIG. 3B, set-screw 304 may threadingly attach to second aperture 316. In various embodiments, set-screw 304 may retain pin 302 within second aperture 316. Although illustrated in FIG. 3B as two separate parts, pin 302 and set-screw 304 may comprise a single unitary part, in accordance with various embodiments.

With reference to FIG. 3A, an anti-rotation surface 312 may be disposed on yoke plate ear 310, in accordance with various embodiments. Anti-rotation surface 312 may be configured to engage wear plate 142. Anti-rotation surface 312 may prevent the wear plate 142 from rotating with respect to yoke plate ear 310. Anti-rotation surface 312 may engage a radially inward surface 346 of wear plate 142.

Figure 4:
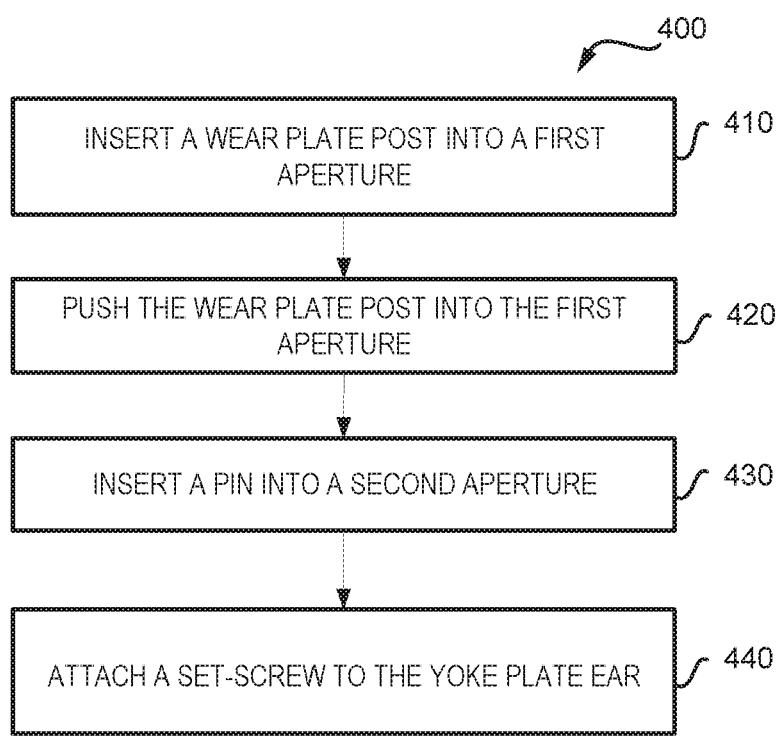
FIG. 4 illustrates a method for installing a wear plate onto a yoke plate, in accordance with various embodiments.

With reference to FIG. 4, a method 400 for installing a wear plate onto a yoke plate is provided, in accordance with various embodiments. Method 400 may include inserting a wear plate post into a first aperture in step 410. Method 400 may include pushing the wear plate post into the first aperture in step 420. Method 400 may include inserting a pin into a second aperture in step 430. Method 400 may include attaching a set-screw to the yoke plate ear in step 440.

With further reference to FIG. 3B and FIG. 3C, step 410 may include installing wear plate 142 onto yoke plate ear 310 by placing post 306 into first aperture 314. Step 420 may include pushing post 306 into first aperture 314 until contact surface 344 makes contact with yoke plate ear 310. Step 430 may include inserting or placing pin 302 into second aperture 316. In response, pin 302 may also be inserted or placed into trench 308 or into retaining aperture 309. Step 440 may include attaching set-screw 304 to yoke plate ear 310 at second aperture 316 to retain pin 302 in second aperture 316. In various embodiments, set-screw 304 may be threadingly attached to yoke plate ear 310.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A yoke plate arrangement, comprising:
a yoke plate;
a wear plate comprising a wear surface and a contact surface, wherein a post extends from the contact surface; and a yoke plate ear extending from the yoke plate and comprising an anti-rotation surface that is normal to a radial direction of the yoke plate ear, wherein a first aperture is disposed in the yoke plate ear, the post is located at least partially within the first aperture, and the contact surface contacts the yoke plate ear via the anti-rotation surface to prevent the wear plate from rotating relative to the yoke plate ear.

2. The yoke plate arrangement of claim 1, wherein the first aperture extends in a first direction and the yoke plate ear comprises a second aperture extending in a second direction, the second direction being substantially perpendicular to the first direction, wherein the first aperture and the second aperture align.

3. The yoke plate arrangement of claim 2, further comprising a retaining feature, the retaining feature located at least partially within the second aperture and configured to retain the post inside of the first aperture.

4. The yoke plate arrangement of claim 3, wherein the post includes a trench extending in the second direction, the retaining feature located at least partially in the trench.

5. The yoke plate arrangement of claim 3, wherein the post includes a retaining aperture, the retaining feature located at least partially in the retaining aperture.

6. The yoke plate arrangement of claim 3, wherein the retaining feature comprises a pin.

7. The yoke plate arrangement of claim 6, wherein the retaining feature further comprises a set-screw, the set-screw threadingly attached to the second aperture.

8. The yoke plate arrangement of claim 2, wherein the first direction comprises an axial direction and the second direction comprises a circumferential direction.

9. The yoke plate arrangement of claim 2, wherein the wear surface is configured to contact a trunnion.

10. The yoke plate arrangement of claim 1, wherein an anti-rotation surface disposed on the yoke plate ear, the anti-rotation surface configured to engage the wear plate to prevent the wear plate from rotating with respect to the yoke plate ear.

11. The yoke plate arrangement of claim 10, wherein the anti-rotation surface is configured to engage a radially inward surface of the wear plate.

12. A propeller pitch change actuation system, comprising:
a propeller coupled to a trunnion;
a forward yoke plate coupled to a shaft, the forward yoke plate comprising a forward yoke plate ear extending from the forward yoke plate;
an aft yoke plate coupled to the shaft, the aft yoke plate comprising an aft yoke plate ear extending from the aft yoke plate and comprising an anti-rotation surface that is normal to a radial direction of the aft yoke plate ear, wherein a first aperture is disposed in the aft yoke plate ear, the first aperture extending in a first direction, the trunnion located between the forward yoke plate ear and the aft yoke plate ear; and
an aft wear plate coupled to the aft yoke plate ear comprising a wear surface and a contact surface, wherein a post extends from the contact surface, the post located at least partially inside of the first aperture, wherein the contact surface contacts the aft yoke plate ear via the anti-rotation surface to prevent the aft wear plate from rotating relative to the aft yoke plate ear.

13. The propeller pitch change actuation system of claim 12, wherein the propeller pitch change actuation system further comprises a forward wear plate coupled to the forward yoke plate ear.

14. The propeller pitch change actuation system of claim 13, wherein the wear surface is in contact with the trunnion, the trunnion located between the aft wear plate and the forward wear plate.

15. The propeller pitch change actuation system of claim 14, wherein the contact surface contacts the forward yoke plate ear.

16. The propeller pitch change actuation system of claim 15, further comprising a retaining feature configured to retain the post within the first aperture.

17. The propeller pitch change actuation system of claim 16, wherein a second aperture is disposed in the aft yoke plate ear, the second aperture extending in a second direction, the retaining feature located at least partially within the second aperture.

18. A method for installing a wear plate onto a yoke plate, comprising:
inserting a wear plate post into a first aperture disposed in the yoke plate;
pushing the wear plate post into the first aperture until a contact surface of the wear plate contacts a yoke plate ear;
inserting a pin into a second aperture disposed in the yoke plate;
attaching a set-screw to the yoke plate ear to retain the pin; and
preventing the wear plate from rotating relative to the yoke plate via an anti-rotation surface disposed on the yoke plate and in contact with the contact surface, the anti-rotation surface being normal to a radial direction of the yoke plate ear.

19. The method of claim 18, wherein the pin is inserted into a trench located in the wear plate post in response to the inserting the pin into the second aperture.

20. The method of claim 18, wherein the pin is inserted into a retaining aperture located in the wear plate post in response to the inserting the pin into the second aperture.

* * * * *